United States Patent
Zhu et al.

(10) Patent No.: US 11,797,927 B2
(45) Date of Patent: Oct. 24, 2023

(54) TRAY SPACE PLANNING METHOD, PALLETIZING METHOD AND APPARATUS THEREOF, AND ELECTRONIC DEVICE

(71) Applicant: MECH-MIND ROBOTICS TECHNOLOGIES LTD., Beijing (CN)

(72) Inventors: Xinv Zhu, Beijing (CN); Zhiwei Zhang, Beijing (CN); Youshuang Ding, Beijing (CN); Tianlan Shao, Beijing (CN); Xi Li, Beijing (CN); Zheng Wang, Beijing (CN)

(73) Assignee: MECH-MIND ROBOTICS TECHNOLOGIES LTD., Beijing (CN)

( * ) Notice: Subject to any disclaimer, the term of this patent is extended or adjusted under 35 U.S.C. 154(b) by 0 days.

(21) Appl. No.: 18/070,473

(22) Filed: Nov. 29, 2022

(65) Prior Publication Data
US 2023/0085643 A1    Mar. 23, 2023

Related U.S. Application Data

(63) Continuation of application No. PCT/CN2020/122216, filed on Oct. 20, 2020.

(30) Foreign Application Priority Data

Jun. 1, 2020  (CN) .......................... 202010485758.4

(51) Int. Cl.
   *G06Q 10/087*   (2023.01)
(52) U.S. Cl.
   CPC ................................ *G06Q 10/087* (2013.01)

(58) Field of Classification Search
   CPC .................................................... G06Q 10/087
   See application file for complete search history.

(56) References Cited

U.S. PATENT DOCUMENTS 9,238,304 B1 * 1/2016 Bradski .................. B65G 47/50
9,457,970 B1 * 10/2016 Zevenbergen ......... B65G 67/02
(Continued)

FOREIGN PATENT DOCUMENTS

| CN | 107479581 A | 12/2017 |
| CN | 108401424 A | 8/2018 |

(Continued)

OTHER PUBLICATIONS

International Search Report dated Feb. 26, 2021 in International Application No. PCT/CN2020/122216. English translation attached.

(Continued)

*Primary Examiner* — Florian M Zeender
*Assistant Examiner* — Vanessa Deligi

(57) ABSTRACT

Provided are a tray space planning method and a palletizing method thereof. The space planning method of the present disclosure can increase a utilization rate of the tray space when a size of a filling material for filing the tray matches a size of the tray by a non-integer multiple. The palletizing method based on the related space planning method, in addition to improving a utilization rate of the tray, can avoid a collision between the current filling material and other filling materials, while ensuring that the filling material approaches in a shortest path based on palletizing at a highest space utilization rate.

6 Claims, 10 Drawing Sheets

(56) References Cited

U.S. PATENT DOCUMENTS

| | | | |
|---|---|---|---|
| 9,688,489 B1* | 6/2017 | Zevenbergen | B25J 11/00 |
| 10,347,037 B2* | 7/2019 | Castaneda | G06T 15/20 |
| 10,647,528 B1* | 5/2020 | Diankov | B25J 9/1664 |
| 11,244,441 B1* | 2/2022 | Jeanes | G06T 11/00 |
| 11,446,824 B2* | 9/2022 | Song | B25J 9/1687 |
| 11,472,640 B2* | 10/2022 | Diankov | B25J 9/1687 |
| 11,635,744 B1* | 4/2023 | Jeanes | G06F 3/04845 345/473 |
| 2004/0074823 A1 | 4/2004 | Brust et al. | |
| 2010/0249988 A1* | 9/2010 | Baldes | B65G 61/00 700/217 |
| 2017/0039304 A1* | 2/2017 | Kim | G06Q 10/08 |
| 2017/0091349 A1* | 3/2017 | R M | G06F 30/13 |
| 2020/0206932 A1* | 7/2020 | Song | B65G 47/901 |
| 2021/0192429 A1* | 6/2021 | Bhat | G06N 5/01 |
| 2021/0216955 A1* | 7/2021 | Gizatov | G06T 19/006 |
| 2022/0044192 A1* | 2/2022 | Bielecki | G06Q 10/087 |
| 2022/0152832 A1* | 5/2022 | Osgouei | B65D 19/385 |

FOREIGN PATENT DOCUMENTS

| | | |
|---|---|---|
| CN | 109940590 A | 6/2019 |
| CN | 110422521 A | 11/2019 |
| CN | 110732601 A | 1/2020 |
| JP | 2000109218 A | 4/2000 |
| KR | 20110054875 A | 5/2011 |
| WO | 2014205475 A1 | 12/2014 |

OTHER PUBLICATIONS

First Office Action from corresponding Chinese Application No. 202010485758.4, dated Jul. 26, 2023. English translation attached.

* cited by examiner

TRAY SPACE PLANNING METHOD, PALLETIZING METHOD AND APPARATUS THEREOF, AND ELECTRONIC DEVICE

CROSS-REFERENCE TO RELATED APPLICATION

This application is a continuation of International Application No. PCT/CN2020/122216, filed on Oct. 20, 2020, which claims priority to Chinese Patent Application No. 202010485758.4, titled "TRAY SPACE PLANNING METHOD, PALLETIZING METHOD AND APPARATUS THEREOF, AND ELECTRONIC DEVICE". The disclosures of the aforementioned applications are hereby incorporated by reference in their entireties.

FIELD

The present disclosure relates to the field of intelligent robot technologies, and more particularly, to a tray space planning method, a palletizing method and apparatus thereof, and an electronic device.

BACKGROUND

In the related art, a robot palletizer can automatically palletize a to-be-transferred material, and thus a transportation robot can conveniently perform transportation, thereby achieving a purpose of automatic transferring.

However, a palletizing method known in the related art is based on a relatively simple planning method for palletizing, in which an operator mainly conducts the manual arrangement and planning. The single stack form planned by the known palletizing method may not adapt to a situation that a size of a tray matches a size of a filling material by a non-integer multiple, which is very common in practical applications. For the non-integer multiples matching situation, problems of unreasonable tray space planning and low space utilization rate are easily caused by the planning method known in the related art.

SUMMARY

An objective of the present disclosure is to solve at least one of the above-mentioned technical problems to a certain extent.

To this end, a first objective of the present disclosure is to provide a tray space planning method.

A second objective of the present disclosure is to provide a palletizing method based on a tray space planning result.

A third objective of the present disclosure is to provide a tray space planning apparatus.

A fourth objective of the present disclosure is to provide a palletizing apparatus based on a tray space planning result.

A fifth objective of the present disclosure is to provide an electronic device.

A sixth objective of the present disclosure is to provide a computer-readable storage medium.

For the first objective of the present disclosure, a tray space planning method is provided. The method is used for performing a simulation planning based on modeling of tray space. The method includes: step S1: performing, based on segmentation lines of various shapes, iterative segmentations on a model image of the tray space in multiple cycles; step S2: selecting, based on the number of segmentation results corresponding to each cycle at the end of the cycle, a maximum number value; and step S3: determining, based on the maximum number value, a corresponding cycle process as an optimal plan. Any one segmentation line of the segmentation lines of various shapes matches a filling surface edge of a filling material for filling the tray space, and includes at least one turning angle matching the filling surface edge. In a single cycle: a first segmentation is performed on the model image of the tray space by using one of the segmentation lines of various shapes as a basis for an initial segmentation of the iterative segmentations; and the remaining segmentations are performed based on an image of an immediately previous segmentation result by using the segmentation line of any shape; in a certain iteration, when a certain space region of the immediately previous segmentation result is smaller than a filling surface of the filling material, the iterative segmentation for the immediately previous segmentation result stops; and until all the iterative segmentations stop, the single cycle ends. In different cycles, segmentation line sequences are different, and segmentation positions of the respective segmentation lines are different, where the segmentation lines referenced by the iterative segmentations in the single cycle follow a corresponding segmentation line sequence, to perform segmentation at a certain position in a space region of a corresponding segmentation result.

In an embodiment, in the single cycle at step S1, said performing the remaining segmentations based on the image of the immediately previous segmentation result by using the segmentation line of any shape includes: segmenting, based on any segmentation position of the segmentation line of any shape in a space region corresponding to the image of the immediately previous segmentation result, the model image of the tray space.

In an embodiment, in the single cycle at step S1, the method further includes: for a segmentation line and a segmentation position, on which any one of the iterative segmentations is based, recording an average number of in-cycle segmentation results per segmentation, the average number of in-cycle segmentation results per segmentation being generated by all segmentations prior to the one iteration segmentation based on the segmentation line and the segmentation position thereof. Said segmenting, based on any segmentation position of the segmentation line of any shape in the space region corresponding to the image of the immediately previous segmentation result, the model image of the tray space includes: segmenting, based on the segmentation line and the segmentation position of the segmentation line that correspond to a maximum value of the average number of in-cycle segmentation results per segmentation, the space region corresponding to the image of the immediately previous segmentation result.

In an embodiment, the method further includes, subsequent to step S3: embedding a filling surface image of the filling surface into each space region corresponding to an optimal planning result; and performing translation in the tray space in a predetermined direction to be compact to obtain a minimum region.

In an embodiment, the method further includes: in the minimum region, moving each compacted filling surface image to a minimum region edge; and/or performing rotation operation or mirror image operation on a result obtained after moving towards the minimum region edge.

In an embodiment, the method further includes: determining, based on the maximum number value, whether a target planning result, matching the filling surface, of the same number of space regions exists in a predetermined matts-shaped plan or a predetermined windmill-shaped plan, and whether an overall region size of the target planning result is not greater than an overall region size of an optimal planning result, wherein the number of space regions of the windmill-shaped plan is an integer multiple of four; and when the target planning result, matching the filling surface, of the same number of space regions exists in the predetermined matts-shaped plan or the predetermined windmill-shaped plan, and when the overall region size of the target planning result is not greater than the overall region size of the optimal planning result, updating, based on a planning manner corresponding to the target planning result in the predetermined matts-shaped plan or the predetermined windmill-shaped plan, an optimal plan.

For the second objective of the present disclosure, a palletizing method based on a tray space planning result is provided. The method includes: determining, based on an overall size of an overall region of the space planning result and a region size of each of segmentation regions in the space planning result, an approaching region surrounding the overall region; and determining, when a filling material to be palletized to a corresponding segmentation region enters the approaching region based on a pre-planned palletizing path, an approaching path of the filling material based on an entry point of the filling material and a center point of the to-be-entered segmentation region.

In an embodiment, said determining, based on the overall size of the overall region of the space planning result and the region size of each of the segmentation regions in the space planning result, the approaching region surrounding the overall region includes: determining, based on a diagonal line of the region size, an external expansion value; and expanding, based on the external expansion value, the overall region externally.

For the third objective of the present disclosure, a tray space planning apparatus is provided. The apparatus is used for performing a simulation planning based on modeling of tray space. The apparatus includes a segmentation module, a selection module, and a planning module. The segmentation module is configured to perform, based on segmentation lines of various shapes, iterative segmentations on a model image of the tray space in multiple cycles. Any one segmentation line of the segmentation lines of various shapes matches a filling surface edge of a filling material for filling the tray space, and includes at least one turning angle matching the filling surface edge. In a single cycle: a first segmentation is performed on the model image of the tray space by using one of the segmentation lines of various shapes as a basis for an initial segmentation of the iterative segmentations; and the remaining segmentations are performed based on an image of an immediately previous segmentation result by using the segmentation line of any shape; in a certain iteration, when a certain space region of the immediately previous segmentation result is smaller than a filling surface of the filling material, the iterative segmentation for the immediately previous segmentation result stops; and until all the iterative segmentations stop, the single cycle ends. In different cycles, segmentation line sequences are different, and segmentation positions of the respective segmentation lines are different, where the segmentation lines referenced by the iterative segmentations in the single cycle follow a corresponding segmentation line sequence, to perform segmentation at a certain position in a space region of a corresponding segmentation result. The selection module is configured to select, based on the number of segmentation results corresponding to each cycle at the end of the cycle, a maximum number value. The planning module is configured to determine, based on the maximum number value, a corresponding cycle process as an optimal plan.

In an embodiment, the segmentation module includes: a segmentation unit configured to segment, based on any segmentation position of the segmentation line of any shape in a space region corresponding to the image of the immediately previous segmentation result, the model image of the tray space.

In an embodiment, the segmentation module further includes: a recording module configured to, for a segmentation line and a segmentation position, on which any one of the iterative segmentations is based, record an average number of in-cycle segmentation results per segmentation, the average number of in-cycle segmentation results per segmentation being generated by all segmentations prior to the one iteration segmentation based on the segmentation line and the segmentation position thereof. The segmentation module is further configured to segment, based on the segmentation line and the segmentation position of the segmentation line that correspond to a maximum value of the average number of in-cycle segmentation results per segmentation, the space region corresponding to the image of the immediately previous segmentation result.

In an embodiment, the apparatus further includes a compression module configured to: embed a filling surface image of the filling surface into each space region corresponding to an optimal planning result; and perform translation in the tray space in a predetermined direction to be compact to obtain a minimum region.

In an embodiment, the apparatus further includes a processing module configured to, in the minimum region, move each compacted filling surface image to a minimum region edge; and/or rotation operation or mirror image operation on a result obtained after moving towards the minimum region edge.

In an embodiment, the apparatus further includes a determination module and an adjustment module. The determination module is configured to determine, based on the maximum number value, whether a target planning result, matching the filling surface, of the same number of space regions exists in a predetermined matts-shaped plan or a predetermined windmill-shaped plan, and whether an overall region size of the target planning result is not greater than an overall region size of an optimal planning result, where the number of space regions of the windmill-shaped plan is an integer multiple of four. The adjustment module configured to, when the target planning result, matching the filling surface, of the same number of space regions exists in the predetermined matts-shaped plan or the predetermined windmill-shaped plan, and when the overall region size of the target planning result is not greater than the overall region size of the optimal planning result, update, based on a planning manner corresponding to the target planning result in the predetermined matts-shaped plan or the predetermined windmill-shaped plan, an optimal plan.

For the fourth objective of the present disclosure, a palletizing apparatus based on a tray space planning result is provided. The apparatus includes: a determining module configured to determine, based on an overall size of an overall region of the space planning result and a region size of each of segmentation regions in the space planning result, an approaching region surrounding the overall region; and a palletizing module configured to determine, when a filling material to be palletized to a corresponding segmentation region enters the approaching region based on a pre-planned palletizing path, an approaching path of the filling material based on an entry point of the filling material and a center point of the to-be-entered segmentation region.

In an embodiment, the determining module includes: an obtaining unit configured to determine, based on a diagonal line of the region size, an external expansion value; and an external expansion unit configured to expand based on the external expansion value, the overall region externally.

For the fifth objective of the present disclosure, an electronic device is provided. The electronic device includes a memory, a processor, and a computer program stored in the memory and executable on the processor. The processor, when executing the computer program, implements the tray space planning method provided by the first objective of the present disclosure, or the palletizing method based on the tray space planning result provided by the second objective of the present disclosure.

For the sixth objective of the present disclosure, a computer-readable storage medium having a computer program stored thereon is provided. The computer program, when executed by a processor, implements the tray space planning method provided by the first objective of the present disclosure, or the palletizing method based on the tray space planning result provided by the second objective of the present disclosure.

In the space planning method and apparatus of the present disclosure, the iterative segmentation is performed on the model image of the tray space in the multiple cycles, and a cycle process having the maximum number of the segmentation result is determined as the optimal plan, thereby increasing a utilization rate of the tray space when a size of a filling material for filing the tray matches a size of the tray by a non-integer multiple.

The palletizing method and apparatus based on the related space planning method, in addition to improving a utilization rate of the tray, can determine the approaching region for palletizing based on the optimal planning result, and can determine the approaching path based on the segmentation region and the approaching region where the filling material enters after the filling material enters the approaching region. In this way, a collision between the current filling material and other filling materials can be avoided, while ensuring that the filling material approaches in a shortest path based on palletizing at a highest space utilization rate. Therefore, the safety of the filling material during the palletizing and the safety of a robot for palletizing operation process can be guaranteed, and an intelligent degree of robot industrial operation can be enhanced.

Additional aspects and advantages of the present disclosure will be provided at least in part in the following description, or become apparent at least in part from the following description, or can be learned from practicing of the present disclosure.

BRIEF DESCRIPTION OF THE DRAWINGS

The above and/or additional aspects and advantages of the present disclosure will become more apparent and more understandable from the following description of embodiments taken in conjunction with the accompanying drawings, in which.

DETAILED DESCRIPTION

Figure 1A:
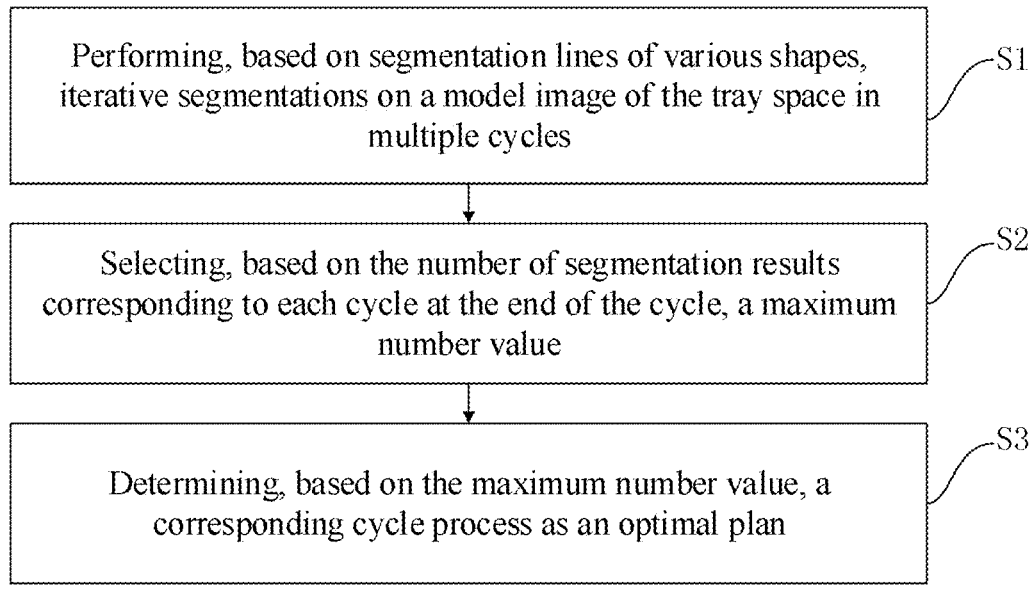
FIG. 1A illustrates a flowchart of a tray space planning method according to an embodiment of the present disclosure.

The embodiments of the present disclosure will be described in detail below with reference to examples thereof as illustrated in the accompanying drawings, throughout which same or similar elements or elements having same or similar functions are denoted by same or similar reference numerals. The embodiments described below with reference to the drawings are illustrative only, and are intended to explain rather than limit the present disclosure.

A tray space planning method, a palletizing method and apparatus thereof according to the embodiments of the present disclosure are described below with reference to the accompanying drawings.

In a first aspect, the tray space planning method of the present disclosure is described, and the method is performed based on space modeling multi-cycle simulation operation is performed on a modeled image of related space to obtain a corresponding result.

In some embodiments, a robot performs palletizing based on a planning result of tray space planning. Further, the tray space planning is defined as a certain process of segmenting a corresponding operation, which is performed for a certain material to fill tray space through palletizing of a robot and based on based on modeling of the tray space. By performing such a process, a process of generating a corresponding to-be-filled palletizing type can be generated. The optimal plan obtained by performing this process corresponds to a generation manner of a generated optimal palletizing type. An optimal planning result is segmented tray space modeling, which includes respective segmentation regions formed by segmentation, i.e., a shape of an optimal palletizing type. In some embodiments, the above-mentioned robot may be a robot arm, or other robots having a function of carrying and moving an object.

In some other embodiments, the tray space planning method may be applied in other scenes other than the robot palletizing, for example, placement of same-specification object based on the tray, etc.

FIG. 1 is a flowchart of a tray space planning method according to an embodiment of the present disclosure. It should be noted that the tray space planning method according to this embodiment is performed by a tray space planning apparatus. The tray space planning apparatus is provided in an electronic device. The description of the tray space planning apparatus and the electronic device may refer to the following embodiments. The electronic device may include, but not limited to, a terminal device, a server, etc., which is not limited in the present disclosure.

In an embodiment, as illustrated in FIG. 1A, the tray space planning method may include the following steps.

In step S1, iterative segmentations are performed on a model image of tray space in multiple cycles, respectively, based on a segmentation line of each shape.

In some embodiments, in order to solve the problem in the related art that the tray space is not fully utilized, the embodiment of the present disclosure provides a tray space planning method. In the tray space planning method, a space planning for an actual tray is simulated by means of a model established on an electronic device to obtain a tray space planning result. The planning may be performed by a simulation platform mounted in tray space modeling of the electronic device.

In some embodiments, the iterative segmentations are performed based on a modeling model of the tray space. The model is highly consistent with actual space of the tray.

It can be understood that segmentation for a certain object is one-time operation. Once the segmentation is performed on the object in a certain manner, segmentation operation in other manners cannot be performed on the object in a same state. Therefore, when performing the segmentation operation in different manners in different cycles, the operation may be performed based on a model image. The same model may include a plurality of images, and each image is highly consistent with the model corresponding thereto. In this way, the segmentation operation can be performed on the same model in manner A, manner B, and manner C, respectively. Therefore, in some embodiments, the segmentation operation in different segmentation manners performed in different cycles is operation performed on the model image.

Figure 1B:
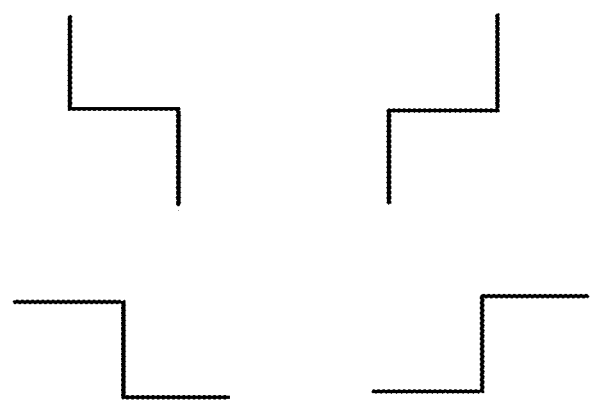
FIG. 1B illustrates a kind of division line according to an embodiment of the present disclosure.

In some embodiments, a shape of a segmentation line matches an edge shape of a filling material to fill the tray space. For example, when the filling material is a box, the segmentation line may match two intersecting sides of the box to present an L shape, or the segmentation line may match the intersecting sides of the box and also match a reverse extension line of a third side located in a same plane as these two sides to further present various step shapes as illustrated in FIG. 1B.

In some other embodiments, the filling material may also be trapezoidal, triangular, or in other irregular shapes.

In some embodiments, a size and shape of the filling materials are the same. That is, when one material is determined, in a subsequent iteration and cycle process, the shape of the segmentation line is determined based on the determined material.

In some embodiments, the iterative segmentation is a process of performing re-segmentation based on an immediately previous segmentation result. The segmentation of each iteration may be based on the same segmentation line or different segmentation lines. The segmentation of each iteration may be based on a segmentation line at a same posture, or segmentation lines at different postures. The segmentation of each iteration may be performed at a same position in a region corresponding to the previous result, and different positions of the region corresponding to the previous result, where the position may be a relative position with respect to a certain reference point in a relevant region or a plurality of fixed positions in the relevant region that are pre-divided in the model image. With respect to the above-related content, this embodiment does not specifically limit. When the iterative segmentation satisfies an iteration ending condition, the iteration ends. An embodiment of the iteration ending condition can refer to the following related description In some embodiments, a plurality of iterations of segmentation is performed following the first segmentation, and the segmentation stops when the iteration ending condition is satisfied. Such a process is referred to as one cycle. In some embodiments, in different cycles, the segmentation lines may have different shapes for each of the respective iterations. In some embodiments, in different cycles, the segmentation lines may have different segmentation positions for each of the respective iterations. In some embodiments, the above-mentioned differences may be embodied as completely different, or partially different.

For ease of description, in following embodiments, for one cycle, a sequence of the segmentation lines of various shapes for different iterations of a plurality of iterations is named as a segmentation line sequence. However, it should be understood that, in the related illustrative embodiments, the segmentation line sequence is merely a name of the shape of the segmentation line on which the respective iterations in one cycle are based and a name of a sequence in which the segmentations are performed based on the shapes of the relevant segmentation lines in the plurality of iterations. The name does not mean that related processes in the related embodiments set the shape and sequence of the segmentation line in advance.

In an embodiment, the filling material can be any object that the robot can operate, for example, a box, an industrial part, a small entity, a logistics package, various types of packages, a packaging box, etc., such that the relevant material fill each segmentation region formed by space planning. The present disclosure does not specifically limit the filling material.

In some embodiments, a tray space model may be a two-dimensional plane model, e.g., a top-view plane of a tray space in reality, or a side-view plane of a tray space in reality. Two-dimensional dimensions corresponding to the two-dimensional plane model can be described by two axes of the Cartesian coordinate system, and the plane defined by the two axes can be, for example, an XOY plane, a YOZ plane, and a XOZ plane.

In some cases, the tray space model may change over time based on the two-dimensional plane model. In some cases, the changed content matches and corresponds to the content practically changed in the tray space observed from a corresponding viewing angle. In some other cases, the changed content matches and corresponds to a part of the content practically changed in the tray space observed from a corresponding viewing angle. For example, a position of the tray space model changes correspondingly with a change of a position of the tray. When a space shape or space area of the tray changes, a space shape or space area of the tray space model also correspondingly changes.

In some embodiments, the tray space model may be a three-dimensional model, which may be described by using the Cartesian coordinate system with any actual space point as a reference.

In some cases, the tray space model may change over time based on the three-dimensional model. In some cases, the changed content matches and corresponds to a content practically changed in the tray space. In some other cases, the changed content in matches and corresponds to a part of the content practically changed in the tray space.

In an embodiment, the tray space model is pre-established based on scene images of the real scene where the tray is located. In an embodiment, the images of the real scene can be collected by means of a visual sensor (such as a three-dimensional industrial camera, a smart industrial camera, and a high-precision industrial camera), and the tray space model can be obtained based on the scene images collected by the visual sensor.

In an embodiment, the images of the real scene can be collected by means of the visual sensor, and point cloud data of the tray space can be obtained based on tray space images collected by the visual sensor, thereby establishing a corresponding model.

In step S2, a maximum number value is selected based on the number of segmentation results corresponding to each cycle at the end of the cycle.

Figure 2A:
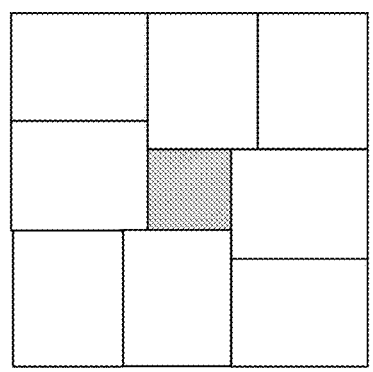
FIG. 2A is a first schematic diagram of an iterative segmentation result according to an embodiment of the present disclosure.
Figure 2B:
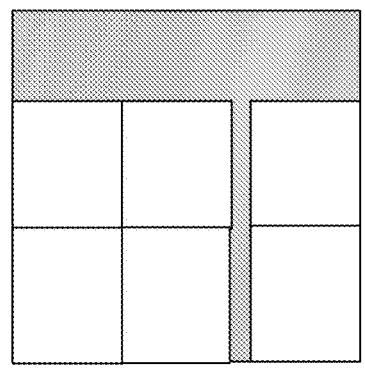
FIG. 2B is a second schematic diagram of an iterative segmentation result according to an embodiment of the present disclosure.

Based on the description of other related embodiments, it can be understood that, when the iteration exits and the iterative segmentation stops, a segmentation effect is reflected in a correspondingly segmented model image, which is explained with reference to FIG. 2. In FIG. 2A, a common region including a shadow part and a non-shadow part is a model corresponding to realistic tray space. The segmentation operation is performed based on a model image obtained by copying the model. The iterative segmentation is performed on one model image of the model in a certain cycle, and a result of the iterative segmentation may be reflected as FIG. 2A. The result of the iterative segmentation includes a space region that can be filled and palletized by a material, as indicated by blank squares in FIG. 2A. After one cycle is completed, the result of the iterative segmentation further includes a free region, the space of which is not sufficient to fill and place the material, as indicated by the shadow region in FIG. 2A. In some embodiments, the number of segmentation results in one cycle only includes the number of the space regions that can be filled and palletized by the material, for example, only including the number of blank regions as illustrated in FIG. 2A. FIG. 2B illustrates a result of the iterative segmentation on another model image of the model according to the embodiment of FIG. 2B. Further, in some embodiments, the number of segmentation results of one cycle corresponding to FIG. 2A is eight, and the number of segmentation results of one cycle corresponding to FIG. 2B is six.

The segmentation iteration in one cycle can refer to the description of the following embodiments.

In step S3, a corresponding cycle process is determined as an optimal plan based on the maximum number value.

In some embodiments, based on the maximum number value of the number of segmentation results, a corresponding cycle process is determined as the optimal plan.

It can be understood that, in some embodiments, in one cycle, the model image of the tray space is segmented based on the segmentation line sequence. Thus, one cycle includes a combination formed by various segmentation performed at different times, and one cycle corresponds to one plan for the tray space. In some embodiments, when a corresponding cycle is determined based on the number of segmentation results, a corresponding plan is determined. The maximum number value of the number of segmentation results corresponds to the optimal plan.

In the space planning method of the present disclosure, the iterative segmentation is performed on the model image of the tray space in the multiple cycles, and a cycle process having the maximum number of the segmentation results is determined as the optimal plan, thereby increasing a utilization rate of the tray space when a size of a filling material for filling a tray matches a size of the tray by a non-integer multiple.

The iterative segmentations performed in a single cycle can refer to the following some embodiments.

In a single cycle, a segmentation line of any shape can be used as a basis for an initial segmentation of the iterative segmentations to perform a first segmentation on the model image of the tray space, and the remaining segmentations are performed based on an image of an immediately previous segmentation result and based on the segmentation line of any shape. In a certain iteration, if a certain space region of the immediately previous segmentation result is smaller than a filling surface of the filling material, the iterative segmentation for this segmentation result stops, until all iterative segmentations stop, the single cycle ends.

Figure 3A:
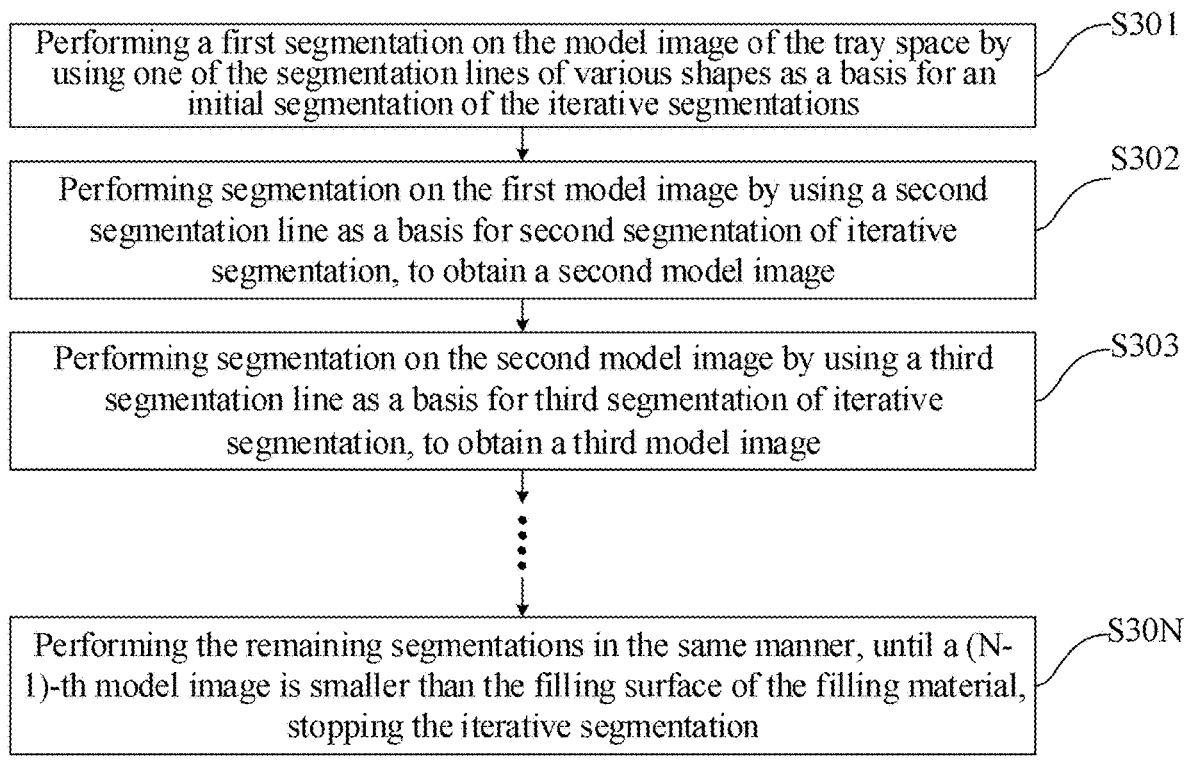
FIG. 3A illustrates a flowchart of another tray space planning method according to an embodiment of the present disclosure.

In some embodiments, the iterative segmentation in the single cycle may include the following steps as illustrated in FIG. 3.

In step S301, a first segmentation is performed on the model image of the tray space by using a first segmentation line as a basis for an initial segmentation of the iterative segmentations, to obtain a first model image. For example, when the accommodation space of the tray is segmented by using an L-shaped segmentation line, two sub-trays can be obtained in the first segmentation.

In step S302, a segmentation is performed on the first model image by using a second segmentation line as a basis for a second segmentation of the iterative segmentations, to obtain a second model image. That is, based on the two sub-trays obtained in the first segmentation, the accommodation space of each sub-tray is further segmented to obtain four sub-trays.

A shape of the second segmentation line in step S302 may be different from the first segmentation line in step S301 in terms of the segmentation line itself. For example, instead of the L-shaped segmentation line, the segmentation is performed based on any of segmentation lines illustrated in FIG. 1B. Certainly, the second segmentation line in step S302 may be different from the first segmentation line in step S301 in terms of a segmentation posture, i.e., the second segmentation line may be obtained by rotating or mirroring the first segmentation line.

In step S303, a segmentation is performed on the second model image by using a third segmentation line as a basis for a third segmentation of the iterative segmentations, to obtain a third model image.

In step S30N, the remaining segmentations can be performed in the same manner, until a (N−1)-th model image is smaller than the filling surface of the filling material, the iterative segmentation stops.

In some examples, when a space region of one sub-tray cannot accommodate a single material, i.e., a space region of a certain segmentation result is smaller than the filling surface of the filling material, the sub-tray stops being further segmented, and so on, until the accommodation space of all the sub-trays obtained by the segmentation cannot accommodate the single material, the segmentation operation stops. Till then, the single cycle ends.

In some embodiments, the plan for the tray space may be performed on a reduced dimension, when compared to the three-dimensional space. The dimension reduction is beneficial to reduce a calculation amount of a planning process. Further, in some embodiments, it is determined based on the filling surface of the filling material whether the iteration shall exit or not. In some embodiments, a viewing angle of the filling surface is consistent with a viewing angle of a space model for establishing the tray is based on.

The plan based on the reduced dimension can be understood as a plane space plan. The three-dimensional planning for the three-dimensional space may be realized through a plurality of plane space plans with different depths. For example, based on the model image of the tray space, firstly, space planning is performed on a bottommost layer, to determine an optimal plan of the bottommost layer; then the space planning is performed on a second layer, to determine an optimal plan of a second; . . . ; until an optimal plan of the highest layer is determined. A position of the model image of tray space in each layer may be adjusted based on actual situations, or a shape of the model image of the tray space may be adjusted with reference to a related stability condition of the three-dimensional space. For example, in order to stabilize the filling material in each layer after filling related space planning results, the model image of the tray space may be correspondingly contracted, or the like.

In some other embodiments, based on the model image of the tray space, firstly, the space planning is performed on the bottommost layer, to determine the optimal plan of the bottommost layer, and then an optimal plan of a higher layer is obtained through rotation operation and mirroring operation, thereby further satisfying stability of the material after the material filling is performed based on the space planning.

Figure 3B:
FIG. 3B illustrates a schematic diagram of a filling surface according to an embodiment of the present disclosure.

In some embodiments, for the plan based on the reduced dimension, a shape of the segmentation line for the iterative segmentation matches the filling surface edge of the filling material. The segmentation line includes a turning angle corresponding to the filling surface edges. For example, when the filling surface is rectangular, the segmentation line shape may be an L-shaped (i.e., including one turning angle), or may be a shape as illustrated in FIG. 1B, which includes two turning angles. When the filling surface is a rounded rectangle as illustrated in FIG. 3B, a shape of the turning angle of the segmentation line correspondingly matches a rounded angle.

In an actual execution process, the segmentation line for each iterative segmentation operation may be randomly determined.

In some embodiments, different segmentations among the iterative segmentations may segment the model image of the tray space based on the segmentation line of any shape at any segmentation position in a space region corresponding to the image of the immediately previous segmentation result. The above-mentioned position may be a relative position with respect to a certain reference part of a corresponding space region, for example, a central point of a certain side of a corresponding fixed region, or a one-third point of a certain side, etc.

Figure 4A:
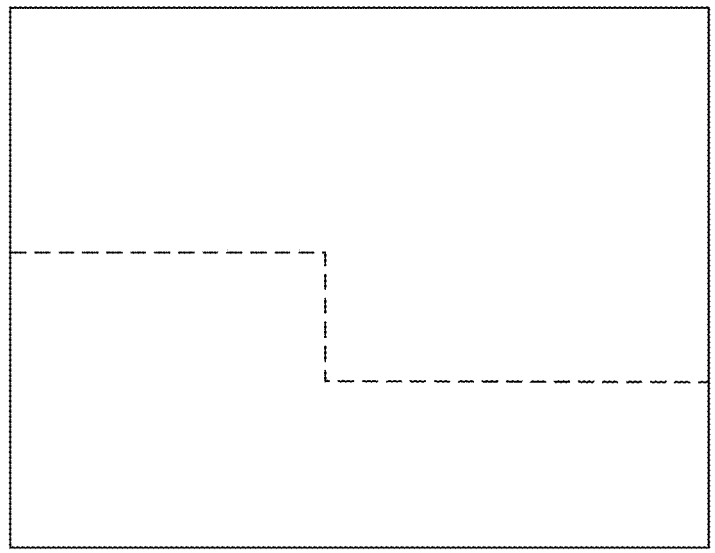
FIG. 4A is a schematic diagram of an initial segmentation at a midpoint of a left side of the model image of a tray space based on a segmentation line shape A.
Figure 4B:
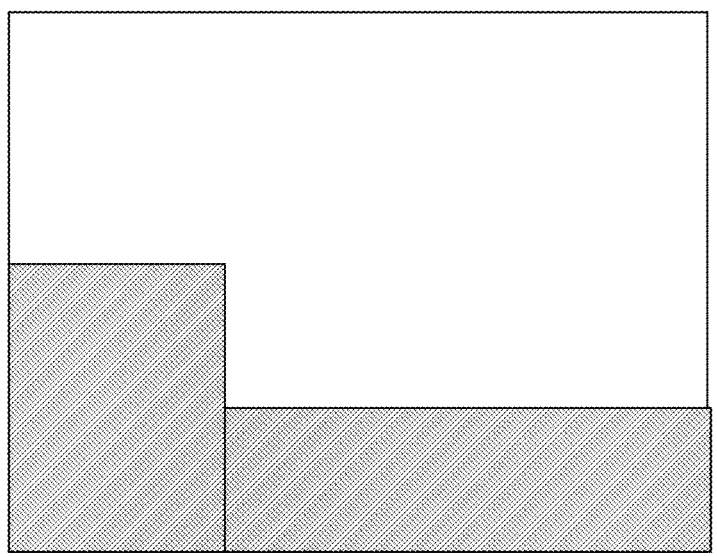
FIG. 4B is a schematic diagram of segmentation regions obtained after the initial segmentation, where the non-shadow part is a region for a second segmentation.
Figure 4C:
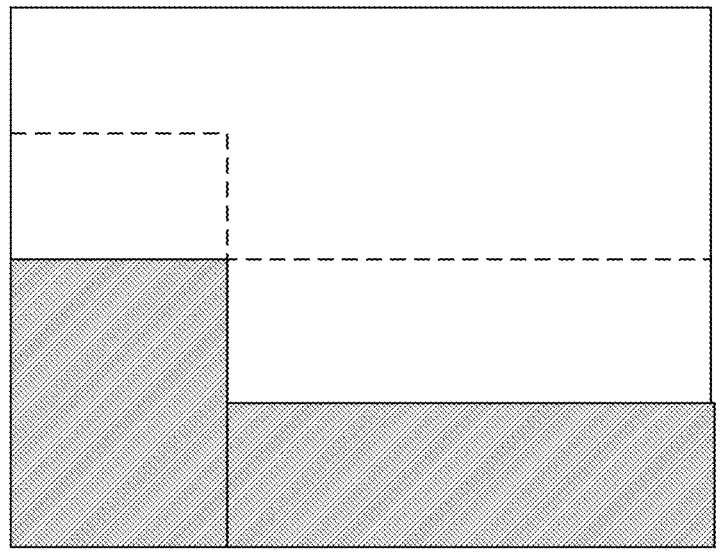
FIG. 4C is a schematic diagram of segmentation results of a second segmentation performed based on the segmentation line shape A at midpoint of a left side of the region for the second segmentation.
Figure 4D:
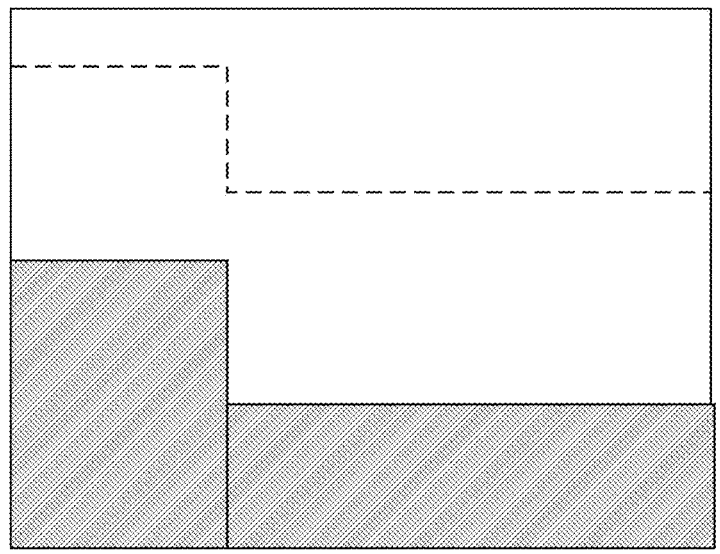
FIG. 4D is a schematic diagram of segmentation results of a second segmentation performed based on the segmentation line shape A at a one third point of the left side of the region for the second segmentation.

In some examples, since types and placement positions of the segmentation line for each segmentation in the iterative segmentations may vary, the number of segmentation results of different cycles may be different. FIG. 4C and FIG. 4D illustrate results obtained based on different types and placement positions of the segmentation lines. The drawing on the left side includes four results, and the right side includes six results.

In some embodiments, in the iterative segmentation process of the single cycle, the number of results, which are generated by the segmentation line and the segmentation position thereof for each iteration segmentation, is recorded. For a segmentation line and a segmentation position thereof that any one iterative segmentation is based on, an average number of in-cycle segmentation results per segmentation is recorded. The average number of in-cycle segmentation results per segmentation generated by all segmentations prior to the one iteration segmentation in one cycle based on the segmentation line and the segmentation position thereof. Further, based on a segmentation line and a segmentation position thereof that have the maximum number of in-cycle segmentation results per segmentation, the space region corresponding to the image of the immediately previous segmentation result is segmented. In a simple illustrative embodiment, as illustrated in FIG. 4A, in the initial segmentation: a midpoint of a left side of the model image of the tray space is segmented based on a segmentation line shape A of a dotted line in FIG. 4A, and the number of in-cycle segmentation results is recorded as 2. The second segmentation focuses on an upper half region of FIG. 4A, i.e., the non-shadow part in FIG. 4B. For the non-shadow part in FIG. 4B, when the segmentation is performed at the midpoint of the left side based on the segmentation line shape A, the number of the in-cycle segmentation results is 3, as illustrated in FIG. 4C. When the segmentation is performed based on the same type of segmentation line shape A at a one third point of the left side, the number of the in-cycle segmentation results is 2, as illustrated in FIG. 4D. Therefore, the recorded average number of in-cycle segmentation results per segmentation for "the segmentation position of the shape A at the midpoint of the left side" is: (the number of in-cycle segmentation results in the initial segmentation+the number of in-cycle segmentation results in the second segmentation)/2 times of segmentation=2.5 per segmentation. Because only the second segmentation is performed based on the "the segmentation position of the shape A at one third point of the left side", the recorded average number of in-cycle segmentation results per segmentation for "the segmentation position of the shape A at one third point of the left side" is 2 per segmentation. Thus, the third segmentation is preferably performed based on "the segmentation position of the shape A is at the midpoint of the left side".

It should be noted that the above embodiments are only the simplest illustrative embodiments, and are intended to explain a decision optimization mechanism for the current and subsequent segmentations based on the previous segmentations in the iterative segmentation process. The description of the above embodiments does not limit the segmentation line shape and an order, a segmentation position, and the number of iterations that are formed by the segmentation line in each segmentation.

Figure 5A:
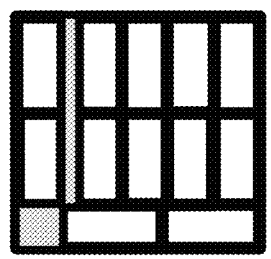
FIG. 5A, FIG. 5B, and FIG. 5C illustrate a process of a compact processing for segmentation results after.
Figure 5B:
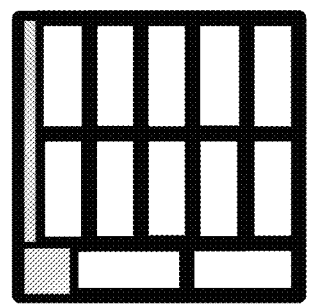

In some embodiments, due to randomness of the segmentation line shape and segmentation position, when the cycle ends, segmentation results in various forms may appear. Accordingly, gaps may exist between the space regions corresponding to the determined optimal plan, and the gaps can be the shadow part of twelve segmentation results illustrated in FIG. 5A. According to some embodiments of the present disclosure, the segmentation results may subject to a compact processing to obtain an effect illustrated in FIG. 5B, which specifically includes the following steps: embedding a filling surface image of each filling surface into each space region corresponding to an optimal planning result, and performing translation in the tray space in a predetermined direction to be compact to obtain a minimum region.

Figure 5C:
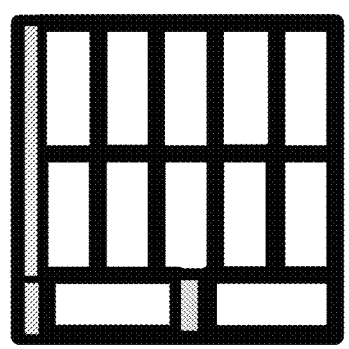

In some embodiments, in the minimum region, each compacted filling surface image is moved to a minimum region edge to make it evenly distribute to obtain an effect illustrated in FIG. 5C. In some embodiments, rotation operation or mirror image operation may be performed on a result obtained after moving towards the minimum region edge.

Figure 6A:
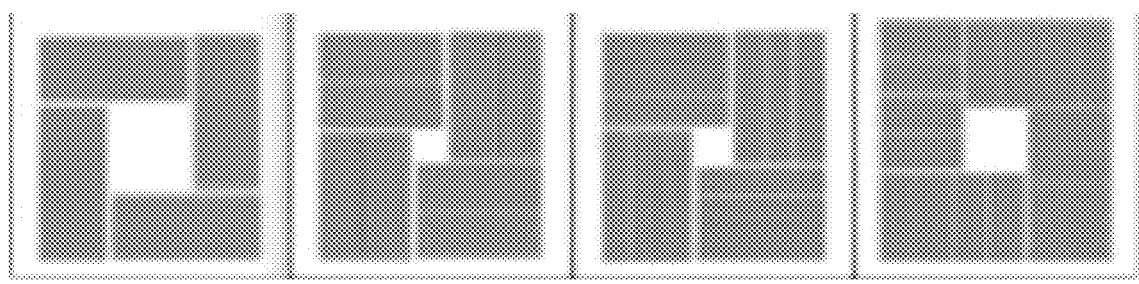
FIG. 6A is a schematic diagram of a four windmill-shaped plannings.
Figure 6B:
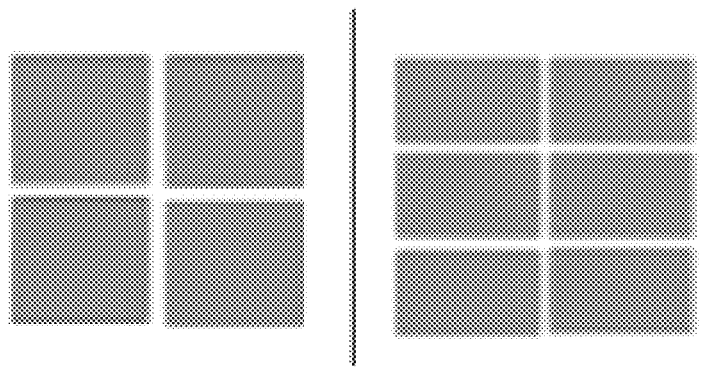
FIG. 6B is a schematic diagram of two matts-shaped planning.

According to some embodiments of the present disclosure, a conventional planning manner may be set in advance, which may include four windmill-shaped plannings as illustrated in FIG. 6A, or two matts-shaped plannings as illustrated in FIG. 6B. The number of regions in the conventional planning manner may be adjusted in a corresponding manner. For example, the matts-shaped plan based on an array distribution may adjust the number of rows/columns that the plan is based on to form a corresponding row/column planning result. The windmill-shaped plan takes a distribution manner similar to "each side of a rectangle" as an arrangement rule and takes "each side of the rectangle" as different units, as illustrated by the four plannings in FIG. 6A, to increase/reduce the number of space regions of each unit. Further, in some embodiments, after the optimal plan is obtained, based on the maximum number value corresponding to the optimal plan, it is determined whether a target planning result, matching the filling surface, of the same number of space regions exists in a predetermined matts-shaped plan or a predetermined windmill-shaped plan, and it is determined whether an overall region size of the target planning result is not greater than an overall region size of an optimal planning result. Here, the number of space regions of the windmill-shaped plan is an integer multiple of four. When the target planning result, matching the filling surface, of the same number of space regions exists in the predetermined matts-shaped plan or the predetermined windmill-shaped plan, and when the overall region size of the target planning result is not greater than the overall region size of the optimal planning result, the optimal plan is updated based on a planning manner corresponding to the target planning result in the predetermined planning of the corresponding type, and the updated optimal plan is adjusted based on a length-width size of the filling surface image.

It can be understood that, when the maximum number value determined after each cycle is an integer multiple of two or four, it is possible that a planning manner consistent with the optimal plan may exist in a predetermined planning manner, and then related operation may be performed based on the predetermined planning manner, such as robot palletizing operation. Therefore, when the maximum number value is the integer multiple of two or four, a planning result corresponding to the optimal plan is compared with a predetermined planning result, and then whether to perform operation based on a predetermined plan is determined. Comparison contents include two aspects. In a first aspect, a space region distribution condition and each region posture of each result are consistent with a result of the predetermined planning manner. In a second aspect, a total area occupied by the result of the predetermined planning manner is not greater than an overall area of each result.

According to a second aspect, the embodiments of the present disclosure provide a palletizing method based on the tray space planning result, which can be understood as a method for filling a related region based on the space planning result. After space planning is performed based on the space planning method, the planning result may be filled based on the palletizing method provided by the present disclosure. The palletizing method of the present disclosure is performed based on the virtual scene matching reality, such that the palletizing method of the present disclosure can determine a corresponding palletizing path based on analog simulation and transmit a result to the robot for palletizing.

In some embodiments, the palletizing method based on the tray space planning result corresponds to a related virtual apparatus, and the related virtual apparatus operates based on the electronic device. The electronic device is configured to communicate with the robot to transmit the palletizing method, which avoids a collision of the materials when the robot palletizes the material and improves an intelligent degree of robot industrial operation. The related description of the virtual apparatus and the electronic device can refer to the subsequent embodiments.

In some embodiments, the robot optionally relates to a robot arm. A form of the robot arm is not specifically limited in the embodiments of the present disclosure. Related operation of the present disclosure performed by a six-axis robot, a four-axis robot, and the robot arm mentioned in the present disclosure, which shall fall within the scope of the present disclosure.

Figure 7:
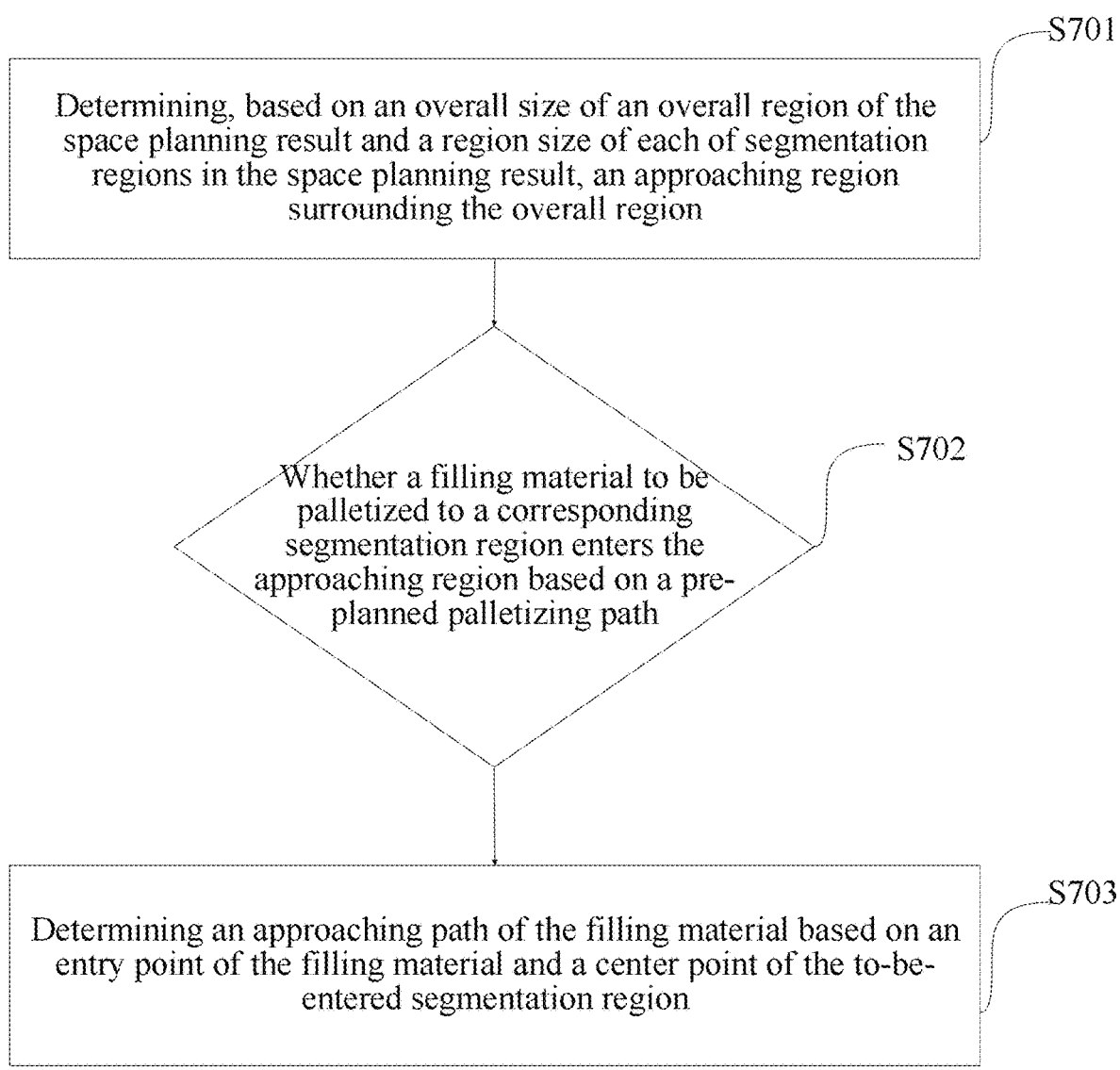
FIG. 7 is a flowchart of a palletizing method according to an embodiment of the present disclosure.

According to the embodiments of the present disclosure, a palletizing method based on the tray space planning result is provided. As illustrated in FIG. 7, the method includes the following steps: step S701 of determining, based on an overall size of an overall region of the space planning result and a region size of each of segmentation regions in the space planning result, an approaching region surrounding the overall region; step S702 of determining whether a filling material to be palletized to a corresponding segmentation region enters the approaching region based on a pre-planned palletizing path; and step S703 of determining, when the filling material to be palletized to the corresponding segmentation region enters the approaching region based on the pre-planned palletizing path, an approaching path of the filling material based on an entry point of the filling material and a center point of the to-be-entered segmentation region.

It can be understood that, in a robot palletizing process, the to-be-palletized material is driven by the robot to fill a pre-planned space region. When filling the corresponding region, i.e., when palletizing a certain material, it is necessary to avoid a collision between the current material and other materials. The collision may not occur far away from an overall region formed by each space region, but only occurs close to the overall region. Therefore, after the space planning is performed based on the optimal space plan, the approaching region is determined around the overall region formed by planning, which is used as a reference for adjusting the palletizing path in the palletizing process.

Figure 8:
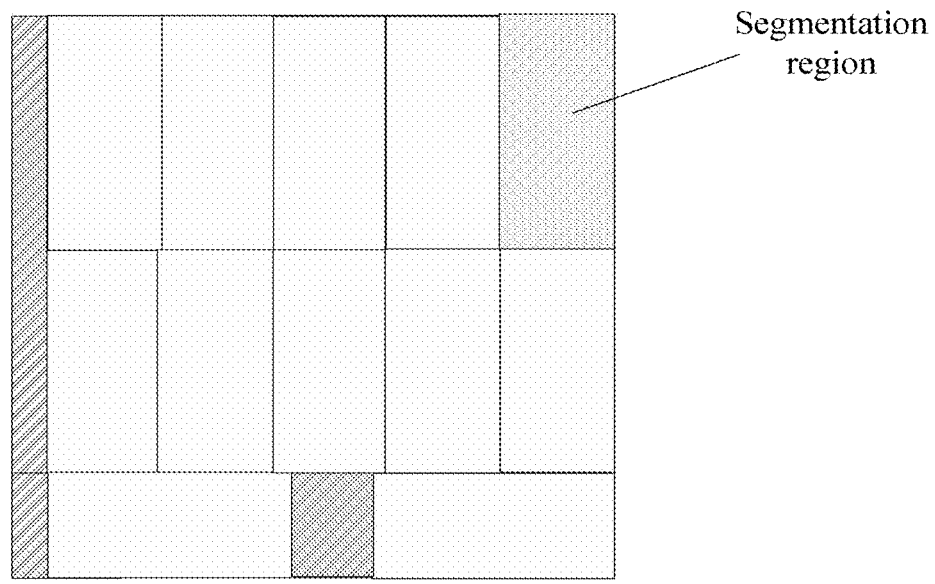
FIG. 8 is a schematic diagram of an optimal planning result according to an embodiment of the present disclosure.

The following embodiments schematically illustrate the overall region and the segmentation region. When the planning result is as illustrated in FIG. 8, the segmentation region may be as illustrated in a dot-matrix filling region in FIG. 8. For example, there are twelve segmentation regions in FIG. 8 for the filling material to be palletized. The twelve segmentation regions, together with the shadow parts denoted by oblique lines, constitute the overall region. In some embodiments, sizes of the segmentation regions are the same.

In some embodiments, the approaching region performs external expansion based on the overall region. A specific external expansion degree may be determined based on a region size of the segmentation region.

In some embodiments, the region size includes a length and a width; or the region size includes a maximum span of a region size calculated based on the length and the width, such as a diagonal line of the rectangle, a long axis of an ellipse, and a longest part of an irregular pattern; or the region size includes a certain part of the maximum span of the region size calculated based on the length and width, such as half of the maximum span, one third of the maximum span, and two thirds of the maximum span.

Figure 9:
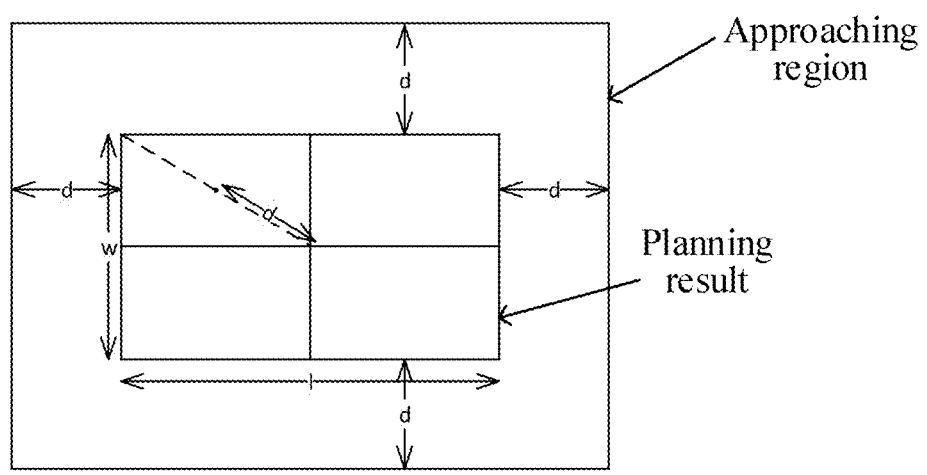
FIG. 9 is a schematic diagram of an approaching region according to an embodiment of the present disclosure.

In some preferred embodiments, FIG. 9 illustrates a degree of the external expansion of the approaching region based on the overall region. An overall size of the overall region in FIG. 9 is w*l, a size of the diagonal line is 2*d, and the approaching region may expand externally d based on the overall size of the overall region. That is, the degree of the external expansion can be half of the diagonal line. In an actual situation, since a grabbing point of the robot on the material is located at a center point of the segmentation region matched with the shape of the material illustrated in FIG. 9, the external expansion degree is further determined as half of the diagonal line of the material.

It should be understood by those skilled in the art that, in some scenarios when the grabbing point of the robot is not located at the center point, the degree of the external expansion of the approaching region can be determined based on the maximum span based on the position of the grabbing point.

It should be noted that, in some embodiments, determination of whether the material enters the approaching region in S702 is determination performed based on a calculation of a simulation model of the virtual scene, and thus, the palletizing method of the present disclosure is pre-planning based on the virtual scene.

In some embodiments, the optimal plan and a corresponding planning result may be obtained based on the tray space planning method. In some embodiments, the optimal plan may include one planning manner for the tray space. In this manner, the segmentation is performed on the tray space in the multiple cycles, respectively, based on the segmentation lines of various shapes matching with the filling material, thereby obtaining the optimal plan. The optimal planning result includes respective segmentation regions of the segmented tray space, and the filling material is placed into the corresponding segmentation region during the palletizing.

In some embodiments, the results generated by the optimal plan may subject to a compact processing based on the size of the filling material to enable the optimal plan to be more compact, or the results generated by the optimal plan may subject to a translation, rotation, mirroring operation to optimize the optimal plan.

In some embodiments, the palletizing is performed based on the optimal plan. Movement of the palletized material after entering the approaching region is referred to as an approaching path. The approaching path is determined based on an entry point where the material enters the approaching region and a center point of the material.

In some embodiments, an initial approaching path may be determined based on a connecting line of the entry point and the center point, and then an included angle between the initial approaching path and a horizontal plane is adjusted based on a height of the palletized material to avoid a collision with other materials.

In some embodiments, a collision during the material palletizing process can be further avoided by determining a filling sequence of the corresponding segmentation regions with the materials. In an embodiment, a sequence reference point may be determined based on a determined intersection point of a reverse extension line of the approaching path entering each segmentation region. Thus, the corresponding materials are palletized from far to near in the corresponding segmentation regions based on a distance between a center point of each segmentation region and the sequence reference point. When the above distances are the same, a marginal segmentation region may be prioritized to be palletized.

In a third aspect, a tray space planning apparatus is provided according to the embodiments of the present disclosure.

Figure 10:
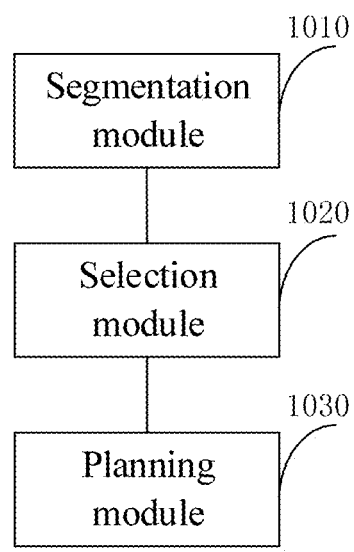
FIG. 10 is a schematic diagram of a tray space planning apparatus according to an embodiment of the present disclosure.

FIG. 10 is a schematic structural diagram of a tray space planning apparatus according to an embodiment of the present disclosure.

As illustrated in FIG. 10, the tray space planning apparatus for performing a simulation planning based on modeling of tray space may include a segmentation module 1010, a selection module 1020, and a planning module 1030.

The segmentation module 1010 is configured perform, based on segmentation lines of various shapes, iterative segmentations on a model image of the tray space in multiple cycles. Any one segmentation line of the segmentation lines of various shapes matches a filling surface edge of a filling material for filling the tray space, and includes at least one turning angle matching the filling surface edge. In a single cycle: a first segmentation is performed on the model image of the tray space by using one of the segmentation lines of various shapes as a basis for an initial segmentation of the iterative segmentations; and the remaining segmentations are performed based on an image of an immediately previous segmentation result by using the segmentation line of any shape; in a certain iteration, when a certain space region of the immediately previous segmentation result is smaller than a filling surface of the filling material, the iterative segmentation for the immediately previous segmentation result stops; and until all the iterative segmentations stop, the single cycle ends. In different cycles, segmentation line sequences are different, and segmentation positions of the respective segmentation lines are different. The segmentation lines referenced by the iterative segmentations in the single cycle follow a corresponding segmentation line sequence, to perform segmentation at a certain position in a space region of a corresponding segmentation result.

According to an embodiment of the present disclosure, the segmentation module 1010 includes a segmentation unit. The segmentation unit is configured to segment, based on any segmentation position of the segmentation line of any shape in a space region corresponding to the image of the immediately previous segmentation result, the model image of the tray space.

According to an embodiment of the present disclosure, the segmentation module 1010 further includes a recording module. The recording module is configured to, for a segmentation line and a segmentation position, on which any one of the iterative segmentations is based, record an average number of in-cycle segmentation results per segmentation, the average number of in-cycle segmentation results per segmentation being generated by all segmentations prior to the one iteration segmentation based on the segmentation line and the segmentation position thereof. The segmentation module is further configured to segment, based on the segmentation line and the segmentation position of the segmentation line that correspond to a maximum value of the average number of in-cycle segmentation results per segmentation, the space region corresponding to the image of the immediately previous segmentation result.

According to an embodiment of the present disclosure, the apparatus further includes: a compression module. The compression module is configured to embed a filling surface image of the filling surface into each space region corresponding to an optimal planning result, and perform translation in the tray space in a predetermined direction to be compact to obtain a minimum region.

According to an embodiment of the present disclosure, the apparatus further includes: a processing module. The processing module is configured to, in the minimum region, move each compacted filling surface image to a minimum region edge; and/or perform rotation operation or mirror image operation on a result obtained after moving towards the minimum region edge.

According to an embodiment of the present disclosure, the apparatus further includes: a determination module and an adjustment module. The determination module is configured to judge, based on the maximum number value, whether a target planning result, matching the filling surface, of the same number of space regions exists in a predetermined matts-shaped plan or a predetermined windmill-shaped plan, and whether an overall region size of the target planning result is not greater than an overall region size of an optimal planning result, wherein the number of space regions of the windmill-shaped plan includes an integer multiple of four. The adjustment module is configured to, when the target planning result, matching the filling surface, of the same number of space regions exists in the predetermined matts-shaped plan or the predetermined windmill-shaped plan, and the overall region size of the target planning result is not greater than the overall region size of the optimal planning result, update, based on a planning manner corresponding to the target planning result in a predetermined corresponding-type planning, an optimal plan, and adjust, based on a length-width size of the filling surface image, the updated optimal plan.

Here, it should be noted that the above explanation of the embodiments of the tray space planning method is also applicable to the tray space planning apparatus according to this embodiment, and details thereof will be omitted here.

The space planning apparatus of the present disclosure performs the iterative segmentations on the model image of the tray space in the multiple cycles, and determines the cycle process having the maximum number of the segmentation result as the optimal plan. The space planning performed by the present disclosure may improve the utilization rate of the tray space under the situation that the size of the filling material filling the tray matches the size of the tray by the non-integer multiple.

In a fourth aspect, the palletizing apparatus based on the tray space planning result of the present disclosure will be introduced.

Figure 11:
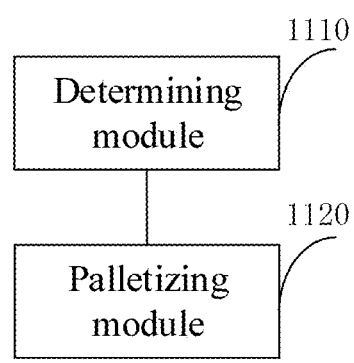
FIG. 11 is a schematic diagram of a palletizing apparatus based on a tray space planning method according to an embodiment of the present disclosure.

FIG. 11 is a schematic structural diagram of a palletizing apparatus based on a tray space planning result according to an embodiment of the present disclosure.

As illustrated in FIG. 11, the apparatus based on the tray space planning result may include a determining module 1110 and a palletizing module 1120. The determining module 1110 is configured to determine, based on an overall size of an overall region of the space planning result and a region size of each of segmentation regions in the space planning result, an approaching region surrounding the overall region. The palletizing module 1120 is configured to determine, when a filling material to be palletized to a corresponding segmentation region enters the approaching region based on a pre-planned palletizing path, an approaching path of the filling material based on an entry point of the filling material and a center point of the to-be-entered segmentation region.

According to an embodiment of the present disclosure, the determining module 1110 includes: an obtaining unit and an external expansion unit. The obtaining unit is configured to determine, based on a diagonal line of the region size, an external expansion value. The external expansion unit is configured to expand, based on the external expansion value, the overall region externally.

It should be noted that the above explanation of the embodiments of the palletizing method based on the tray space planning result is also applicable to the palletizing apparatus based on the tray space planning result according to this embodiment, and details thereof will be omitted herein.

According to the embodiments of the present disclosure, in addition to improving a utilization rate of the tray, the palletizing apparatus based on the tray space planning result can determine the approaching region for palletizing based on the optimal planning result, and can determine the approaching path based on the segmentation region and the approaching region where the filling material enters after the filling material enters the approaching region. In this way, a collision between the current filling material and other filling materials can be avoided, while ensuring that the filling material approaches in a shortest path based on palletizing at a highest space utilization rate. Therefore, the safety of the filling material during the palletizing and the safety of a robot for palletizing operation process can be guaranteed, and an intelligent degree of robot industrial operation can be enhanced.

Figure 12:
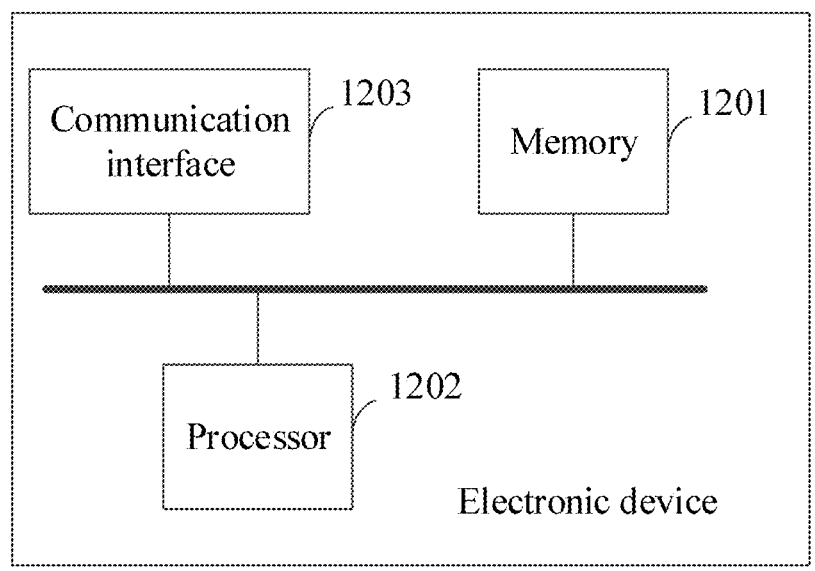
FIG. 12 is a schematic diagram of an electronic device according to an embodiment of the present disclosure.

FIG. 12 is a schematic structural diagram of an electronic device according to an embodiment of the present disclosure. The electronic device may include a memory 1201, a processor 1202, and a computer program stored in the memory 1201 and executable on the processor 1202.

The processor 1202, when executing the computer program, implements the tray space planning method according to the above embodiments.

In an embodiment of the present disclosure, the processor 1202, when executing the computer program, implements the palletizing method based on the tray space planning result according to the above embodiments.

Further, the electronic device further includes a communication interface 1203.

The communication interface 1203 is configured for communication between the memory 1201 and the processor 1202.

The memory 1201 has a computer program executable on the processor 1202 stored thereon.

The memory 1201 may include a high-speed Random Access Memory (RAM) memory, and may also include a non-volatile memory, e.g., at least one magnetic disk memory.

When the memory 1201, the processor 1202, and the communication interface 1203 are implemented independently, the communication interface 1203, the memory 1201, and the processor 1002 may be connected to and communicate with each other via a bus. The bus may be an Industry Standard Architecture (ISA) bus, a Peripheral Component Interconnect (PCI) bus, an Extended Industry Standard Architecture (EISA) bus, etc. The bus can be categorized into an address bus, a data bus, a control bus, etc. For the sake of description convenience, only one thick line is drawn in FIG. 12 to represent the bus, but this does not mean that only one bus or one type of bus is present.

In an embodiment, in a specific implementation, when the memory 1201, the processor 1002, and the communication interface 1203 are integrated in a single chip, the memory 1201, the processor 1202, and the communication interface 1203 can communicate with each other via internal interfaces.

The processor 1202 may be a Central Processing Unit (CPU), or an Application Specific Integrated Circuit (ASIC), or may be configured to implement one or more integrated circuits according to the embodiments of the present disclosure.

The embodiments of the present disclosure further provide a computer-readable storage medium. The computer-readable storage medium has a computer program stored thereon. The computer program, when executed by a processor, implements the tray space planning method, or the palletizing method based on the tray space planning result, as described above.

In the description of the specification, description with reference to a term "an embodiment," "some embodiments," "an example," "a specific example," or "some examples" means that a particular feature, structure, material, or characteristic described in connection with the embodiment or example is included in at least an embodiment or example of the present disclosure. The illustrative expressions of the above terms in this specification are not necessarily referring to the same embodiment or example. Furthermore, the particular features, structures, materials, or characteristics described may be combined in any suitable manner in one or more embodiments or examples. In addition, different embodiments or examples and features of different embodiments or examples described in the specification may be combined by those skilled in the art without mutual contradiction.

In the description of the present disclosure, it can be appreciated that terms such as "first" and "second" are used herein for purposes of description only and are not intended to indicate or imply relative importance, or implicitly indicate the number of technical features indicated. Thus, the feature defined with "first" and "second" may explicitly or implicitly include one or more of the features. In the description of the present disclosure, "N" means at least two, for example, two or three, unless specified otherwise.

Description of any process or method described in a flow chart or described herein in other ways may represent a module, segment or part including codes of one or more N executable instructions for achieving specific logical functions or steps in the process, and the scope of preferred embodiments of the present disclosure includes additional implementations, which may be executed in a different order from the illustrated or discussed order, including a substantially simultaneous order or reverse order, depending on functions involved, which should be understood by those skilled in the art of the embodiments of the present disclosure.

The logics and/or steps represented in the flowchart or described otherwise herein can be for example considered as a list of ordered executable instructions for implementing logic functions, and can be embodied in any computer-readable medium that is to be used by or used with an instruction execution system, apparatus, or device (such as a computer-based system, a system including a processor, or any other system that can extract and execute instructions from an instruction execution system, apparatus, or device). For the present disclosure, a "computer-readable medium" can be any apparatus that can contain, store, communicate, propagate, or transmit a program to be used by or used with an instruction execution system, apparatus, or device. More specific examples of computer-readable mediums include as a non-exhaustive list: an electrical connector (electronic device) with one or N wirings, a portable computer disk case (magnetic devices), a Random Access Memory (RAM), a Read Only Memory (ROM), an Erasable Programmable Read Only Memory (EPROM or flash memory), a fiber optic device, and a portable Compact Disk Read Only memory (CDROM). In addition, the computer-readable medium may even be paper or other suitable medium on which the program can be printed, as the program can be obtained electronically, e.g., by optically scanning the paper or the other medium, and then editing, interpreting, or otherwise processing the scanning result when necessary, and then storing it in a computer memory.

It should be understood that, various parts of the present disclosure may be embodied by hardware, software, firmware, or combinations thereof. In the above embodiments, N steps or methods may be embodied by the software or firmware stored in the memory and executed by an appropriate instruction execution system. For example, if it is embodied by the hardware, likewise in another embodiment, the steps or methods may be realized by one or a combination of the following techniques known in the related art: a discrete logic circuit having a logic gate circuit for realizing a logic function of a data signal, an application-specific integrated circuit having an appropriate combination logic gate circuit, a Programmable Gate Array (PGA), a Field Programmable Gate Array (FPGA), etc.

It can be understood by those skilled in the art that all or a part of the steps of the method according to the above embodiments may be implemented by relevant hardware instructed by a program. The program may be stored in a computer-readable storage medium. The program, when being executed, implements one or a combination of the steps of the method according to the above embodiments.

In addition, individual functional units in the embodiments of the present disclosure may be integrated in one processing module or may be separately and physically exist, or two or more units may be integrated in one module. The integrated module as described above may be implemented in a form of hardware or in a form of a software functional module. If the integrated module is implemented in the form of a software functional module and sold or used as a separate product, the integrated module may be stored in a computer-readable storage medium.

The storage medium mentioned above may be a read-only memory, a magnetic disk, or a CD, etc. Although the embodiments of the present disclosure have been illustrated and described above, it is to be appreciated that the above embodiments are exemplary, and cannot be construed as limiting the present disclosure. Those skilled in the art may make changes, modifications, substitutions, and variations to the above embodiments within the scope of the present disclosure.

What is claimed is:

1. A tray space planning method for performing a simulation planning based on modeling of tray space, the method comprising:
   step S1: performing, based on segmentation lines of various shapes, iterative segmentations on a model image of the tray space in multiple cycles, wherein:
   any one segmentation line of the segmentation lines of various shapes matches a filling surface edge of a filling material for filling the tray space, and comprises at least one turning angle matching the filling surface edge;
   in a single cycle: a first segmentation is performed on the model image of the tray space by using one of the segmentation lines of various shapes as a basis for an initial segmentation of the iterative segmentations; and the remaining segmentations are performed based on an image of an immediately previous segmentation result by using the segmentation line of any shape; in a certain iteration, when a certain space region of the immediately previous segmentation result is smaller than a filling surface of the filling material, the iterative segmentation for the immediately previous segmentation result stops; and until all the iterative segmentations stop, the single cycle ends; and
   in different cycles, segmentation line sequences are different, and segmentation positions of the respective segmentation lines are different, wherein the segmentation lines referenced by the iterative segmentations in the single cycle follow a corresponding segmentation line sequence, to perform segmentation at a certain position in a space region of a corresponding segmentation result;
   step S2: selecting, based on the number of segmentation results corresponding to each cycle at the end of the cycle, a maximum number value; and
   step S3: determining, based on the maximum number value, a corresponding cycle process as an optimal plan; and
   step S4: palletizing, by a robot palletizer based on segmentation regions of the segmented tray space indicated by the optimal plan, the filling material into the segmentation regions.

2. The method according to claim 1, wherein in the single cycle of step S1, said performing the remaining segmentations based on the image of the immediately previous segmentation result by using the segmentation line of any shape comprises:
   segmenting, based on any segmentation position of the segmentation line of any shape in a space region corresponding to the image of the immediately previous segmentation result, the model image of the tray space.

3. The method according to claim 2, further comprising, in the single cycle of step S1:
   for a segmentation line and a segmentation position, on which any one of the iterative segmentations is based, recording an average number of in-cycle segmentation results per segmentation, the average number of in-cycle segmentation results per segmentation being generated by all segmentations prior to the one iteration segmentation based on the segmentation line and the segmentation position thereof;
   wherein said segmenting, based on any segmentation position of the segmentation line of any shape in the space region corresponding to the image of the immediately previous segmentation result, the model image of the tray space comprises:
   segmenting, based on the segmentation line and the segmentation position of the segmentation line that correspond to a maximum value of the average number of in-cycle segmentation results per segmentation, the space region corresponding to the image of the immediately previous segmentation result.

4. The method according to claim 3, further comprising, subsequent to step S3:
   embedding a filling surface image of the filling surface into each space region corresponding to an optimal planning result; and
   performing translation in the tray space in a predetermined direction to be compact to obtain a minimum region.

5. The method according to claim 4, further comprising:
   in the minimum region, moving each compacted filling surface image to a minimum region edge; and/or
   performing rotation operation or mirror image operation on a result obtained after moving towards the minimum region edge.

6. The method according to claim 1, further comprising:
   determining, based on the maximum number value, whether a target planning result, matching the filling surface, of the same number of space regions exists in a predetermined watts-shaped plan or a predetermined windmill-shaped plan, and whether an overall region size of the target planning result is not greater than an overall region size of an optimal planning result, wherein the number of space regions of the windmill-shaped plan is an integer multiple of four; and
   when the target planning result, matching the filling surface, of the same number of space regions exists in the predetermined matts-shaped plan or the predetermined windmill-shaped plan, and when the overall region size of the target planning result is not greater than the overall region size of the optimal planning result, updating, based on a planning manner corresponding to the target planning result in the predetermined matts-shaped plan or the predetermined windmill-shaped plan, an optimal plan.

* * * * *